| United States Patent [19] | [11] Patent Number: 4,871,616 |
| Kimura et al. | [45] Date of Patent: Oct. 3, 1989 |

[54] SURFACE-TREATED POLY METHYL SILSEQUOXANE POWDER

[75] Inventors: Hiroshi Kimura; Akira Takagi, both of Ohta, Japan

[73] Assignee: Toshiba Silicone Co., Ltd., Japan

[21] Appl. No.: 108,845

[22] Filed: Oct. 14, 1987

[30] Foreign Application Priority Data

Oct. 20, 1986 [JP] Japan .................................. 61-247344

[51] Int. Cl.$^4$ .......................... C08G 77/04; C07F 7/08; G03G 9/00
[52] U.S. Cl. ..................................... 428/407; 427/222; 428/402; 428/403; 430/110; 528/21; 556/450
[58] Field of Search ........................ 428/402, 403, 407; 427/212, 213, 222; 430/108, 110, 126; 528/21; 556/450

[56] References Cited

U.S. PATENT DOCUMENTS

| 4,043,952 | 8/1977 | Ganshaw et al. | 525/353 |
| 4,144,184 | 3/1979 | Takahata et al. | 430/115 |
| 4,368,297 | 1/1983 | Kato et al. | 525/342 |
| 4,409,312 | 10/1983 | Ikeda et al. | 430/110 |
| 4,417,018 | 11/1983 | Ogawa et al. | 524/261 |
| 4,483,107 | 11/1984 | Tomoyori et al. | 528/14 |
| 4,528,390 | 7/1985 | Kimura | 528/21 |
| 4,533,617 | 8/1985 | Inoue et al. | 430/111 |
| 4,600,677 | 7/1986 | Hoffend et al. | 430/108 |
| 4,652,618 | 3/1987 | Sumida et al. | 525/476 |
| 4,657,838 | 4/1987 | Fukumoto et al. | 430/110 |
| 4,687,705 | 8/1987 | Miyatsuka et al. | 428/405 |

*Primary Examiner*—George F. Lesmes
*Assistant Examiner*—James B. Monroe, II

[57] ABSTRACT

A surface-treated poly methyl silsesquioxane powder characterized by surface-treatment with an agent comprising a compound which has at least two radicals attached to a metal atom or a silcon atom, said radical is selected from the group consisting of a hydroxyl radical, a hydrolyzable radical and a monovalent hydrocarbon radical substituted by a polar group.

6 Claims, No Drawings

SURFACE-TREATED POLY METHYL SILSEQUOXANE POWDER

The present application claims the priority of Japanese Patent Application Ser. No. 61-247344 filed on Oct. 20, 1986.

BACKGROUND OF THE INVENTION

This invention relates to a surface-treated poly methyl silsesquioxane powder. More particularly, it relates to a surface-treated poly methyl silsesquioxane powder having a properly controlled contact static charge.

It is known that poly methyl silsesquioxane can be obtained by hydrolysis of a trifunctional silane, such as methyltrichlorosilane, followed by polycondensation. For example, Belgian Patent No. 572,412 teaches a method of obtaining solid poly methyl silsesquioxane by hydrolyzing methyltrichlorosilane in an atomized state, or by adding it dropwise to a large volume of water to effect hydrolysis. These methods, however, have a disadvantage that a considerable quantity of chlorine is left in the powder of poly methyl silsesquioxane formed. To solve this difficulty Japanese Patent Publication Kokai No. 54-72300 discloses a process in which a methyltrialkoxysilane and/or a partial hydrolyzate thereof is hydrolyzed in an aqueous solution of an alkaline earth metal hydroxide or an alkali metal carbonate to effect polycondensation.

Such a process is free of the aforementioned disadvantage, but poses a new problem that the powder of poly methyl silsesquioxane formed still contains considerable amounts of alkaline earth metal or alkali metal. In Japanese Patent Publication Kokai No. 60-13813, one of the inventors of the present invention proposes a process in which a methyltrialkoxysilane and/or a partial hydrolyzate thereof is hydrolyzed in an aqueous solution of an amine and/or ammonia to effect polycondensation, thereby giving a powder of poly methyl silsesquioxane free from the problems mentioned above and having excellent free-flowing property.

The powder of poly methyl silsesquioxane thus prepared has found uses as an additive for rubber and plastics to enhance their water resistance and lubricity, as an anti-blocking agent for powder, and as an additive for grease to render it thixotropic. Efforts are continued to obtain powder of poly methyl silsesquioxane with better performance qualities, such as more spherical and finer particles, in order to further broaden its application fields. One of the inventors of the present invention formerly carried out the hydrolysis/polycondensation reaction described in Japanese Patent Publication Kokai No. 60-13813 at the interface between the layer of methyl trialkoxysilane and/or its parial hydrolyzate and the aqueous layer of ammonia and/or amine solution, while stirring the mixture under a controlled condition. Thus the inventor succeeded in producing a powder of poly methyl silsesquioxane which comprises nearly spherical, independent particles having a narrow particle size distribution, and having a large negative contact charge.

The powder of poly methyl silsesquioxane thus prepared, because of its particle shape and the large negative contact charge, can be applied not only to conventional uses but also to other fields in which a sharp particle size distribution is required.

The excessively large negative contact charge, however, causes problems in some cases when this powder is used as an anti-blocking agent or anti-sagging agent for electrophotographic toners, or when it is used in admixture with other type of powders. When added to a positively charged toner, for example, it decreases the positive charge of the toner, thereby adversely affecting the toner deposition on the surface of photosensitive drum. This phenomenon leads to a development failure.

Japanese Patent Publication Kokoku No. 53-22447 discloses metal oxide powders treated with an aminosilane for an additive to electrophotographic toners. However, it takes a long time to incorporate such treated powders with a base resin for toner and carbon black, and the toner thus obtained tends to agglomerate. Further, the treated metal oxide powders do not give enough surface slip, when they are incorporated into a synthetic resin. Thus a powder free of such problems is desired.

DESCRIPTION OF THE INVENTION

This invention relates to a surface-treated powder of poly methyl silsesquioxane.

The surface-treating agent for use in the invention has at least two radicals attached to a metal atom or a silicon atom wherein said radical is selected from the group consisting of a hydroxyl radical, a hydrolyzable radical and a monovalent hydrocarbon radical substituted by a polar group.

Untreated poly methyl silsesquioxane powder used in this invention is prepared, for example, as follows. Methyltrialkoxysilane or a partial hydrolyzate thereof is settled as an upper layer, and aqueous solution of ammonia or amine is settled as a lower layer. At this time, watersoluble organic solvents may be incorporated in the lower layer. Methyltrialkoxysilane or a partial hydrolyzate thereof are hydrolyzed and polycondensed slowly at the interface of the two layers. Spherical particles of poly methyl silsesquioxane are formed as the reaction proceeds, which gradually move toward the lower layer and turn it opaque white.

The suitable stirring conditions for this reaction may vary with the shape of agitator blades used and the composition of the alkaline solution. However, stirring should preferably be conducted at a speed of 2 to 100 r.p.m., most preferably at a speed of 5 to 50 r.p.m., in order to obtain spherical particles of a narrow particle size distribution.

The reaction is allowed to proceed until the upper layer is consumed and disappears, and stirring is further continued to complete the reaction. The conditions of this final-stage reaction may vary with the amounts of materials charged and other factors; but 1 to 10 hours of stirring is normally appropriate, and the temperature may be raised to about 50° C. as required.

The reaction mixture is filtered through a wire gauze to remove gel, the resulting dispersion is dehydrated by centrifugal separation or filtration, and the paste thus obtained is dried to a powder by heating at 100° to 220° C. and deagglomerating by means of a jet mill or the like. The powder of poly methyl silsesquioxane thus obtained contains more than 95% of nearly spherical particles and shows a contact charge of $-200$ to $-2000\mu C/g$.

The average particle size of the poly methyl silsesquioxane powder thus obtained is not critical. The particle diameter of 200 $\mu m$ or smaller is preferable by reason of the mechanical strength of the molded article, when the surface-treated powder is incorporated into a synthetic resin for making the surface of the article slippery or giving it antistatic. In such a case as described above, the particle diameter of 20μm or smaller is more preferable, and a spherical particle is preferable for high density loading. The particle diameter of 5μm or smaller is recommended as an additive for electrophotographic toners, and a spherical particle with narrow diameter distribution is more preferable.

The surface-treating agent used in this invention serves to decrease the negative contact charge on the treated surface of poly methyl silsesquioxane powder, or to make the treated surface positively charged. The metal atoms in he surface-treating agent are exemplified by titanium, aluminum, tin, lead, zinc and iron. Of these, titanium, aluminum and tin are preferable because of the high surface treatment effect, that is, the high effectiveness to control the contact charge.

A examples of the hydrolyzable radicals that can be attached to the metal or silicon atom, there may be mentioned halogen atoms, such as chlorine and bromine; alkoxy radicals, such as methoxy, ethoxy and propoxy; acetoxy radical; oxime radical; and aminoxy radical. The hydrocarbon radicals substituted by a polar group may be exemplified by γ-amino propyl, γ-(aminoethylamino)propyl and γ-chloropropyl radical.

Illustrative of such organometallic compounds are aluminum compounds and hydrolysis/condensation products therefrom, such as aluminum ethylate, aluminum isopropylate, mono-sec-butoxyaluminum diisopropylate, aluminum secbutylate and ethylacetoacetate aluminum diisopropylate; titanium compounds and hydrolysis/condensation products therefrom, such as tetrabutyl titanate; and tin compounds, such as dibutyltin diacetate. As examples of such silicon compounds, there may be mentioned chlorosilanes, such as dimethyldichlorosilane, methyltrichlorosilane and diphenyldichlorosilane; and alkoxysilanes, such as dimethyldimethoxysilane, methyltrimethoxysilane, methyltriethoxysilane, and compounds shown below, $H_2NCH_2CH_2NHCH_2CH_2CH_2Si(CH_3)(OCH_3)_2$,
$H_2NCH_2Ch_2NHCH_2CH_2CH_2Si(OCH_3)_3$,
$H_2NCONHCH_2CH_2CH_2Si(\cdot C_2H_5)_3$,
$H_2NCH_2CH_2CH_2Si(OCH_3)_3$,
$H_2NCH_2CH_2CH_2Si(\cdot C_2H_5)_3$,
$(CH_3)_2NCH_2CH_2CH_2Si(OC_2H_5)_3$,
$(CH_3)_2NCH_2CH_2CH_2Si(OCH_3)_3$,
$(CH_3CH_2)_2NCH_2CH_2CH_2Si(OCH_3)_3$,
$H_2NCH_2CH_2NHCH_2CH_2NHCH_2CH_2CH_2Si(OCH_3)_3$,
$H_5C_2OCOCH_2CH_2NHCH_2CH_2CH_2Si(OCH_3)_3$,
$H_5C_2OCOCH_2CH_2NHCH_2CH_2NHCH_2CH_2CH_2Si(OCH_3)_3$,
$H_5C_2OCOCH_2CH_2NHCH_2Ch_2NHCH_2CH_2NHCH_2CH_2NHCH_2CH_2CH_2Si(OCH_3)_3$,
$H_2NC_6H_4Si(OCH_3)_3$,
$C_6H_5NHCH_2CH_2CH_2Si(OCH_3)_3$.

Poly methyl silsesquioxane powder may be surface-treated by any method that is capable of treating such surface with the aforementioned surface-treating agent. For example, a surface-treating agent is added to poly methyl silsesquioxane powder placed in a suitable container, and the mixture is stirred at a temperature range from room temperature to 120° C. for one to eight hours. In this case, more uniform treatment can be achieved if the surface-treating agent is added dropwise in organic solvent solution while stirring the mixture. The type and amount of surface-treating agent used may be properly selected depending upon the desired contact charge. When the treated powder is to be positively charged, this can be effected by treatment with an aluminum alkoxide or alkoxysilane having an amino group. When the treated powder is to be negatively charged and the negative charge is to be less than that of the untreated powder, a titanium alkoxide may be used as a treating agent. The inventors found that, with the untreated powder of poly methyl silsesquioxane used in this invention, the finer the particle size, the greater the negative contact charge. The treated product obtained above is then heated at a temperature higher than 120° C. to remove the solvent and other unnecessary substances, giving a surface-treated powder of poly methyl silsesquioxane.

As is apparent from the foregoing, the surface-treated powder of poly methyl silsesquioxane of this invention has a decreased negative contact charge than that of untreated powder, or has a positive contact charge, and its quantity of static charge can be properly controlled to meet particular needs. Hence it is very useful as an anti-blocking additive for electrophotographic toners, and as a filler or additive for synthetic resins to produce plastic film with excellent surface slip, release or antistatic property.

EXAMPLES OF THE INVENTION

The invention will become more apparent from the following examples, in which parts all mean parts by weight.

Preparation 1

In a four-necked flask equipped with a thermometer, a reflux condenser and a stirrer, were placed 4000 parts of water and 50 parts of 28% ammonia water, and the mixture was stirred well. 600 parts of methyltrimethoxysilane containing 10 ppm of chlorine or chlorine compounds as chlorine atom was then added, giving a two-layer state consisting of an upper methyltrimethoxysilane layer and a lower ammonia water layer. Stirring was continued while maintaining the two-layer state to allow the hydrolysis/polycondensation reaction to proceed at the interface of the two layers. As the reaction progressed, the reaction product formed at the interface gradually descended into the lower layer and became suspended therein, thus turning it turbid. At the same time, the upper methyltrimethoxysilane layer gradually diminished and eventually disappeared in about three hours. The resulting dispersion was heated to between 50° and 60° C., stirred for an additional three hours, and then cooled to 25° C. The reaction mixture was filtered through a 100-mesh wire gauze to remove gel, the filtrate was dehydrated by centrifugal separation, the cake thus obtained was dried in an oven at 200° C., and the dried raw powder was deagglomerated by means of a jet mill, giving white powder.

Observation of the powder of poly methyl silsesquioxane thus prepared under an electron microscope revealed that it consists of nearly spherical particles with aspect ratios of 1.0 to 1.2. Further, the particles had an average particle diameter of about 1.9μm, and more than 99% of particles were distributed in 1.7 to 2.1μm diameter range.

EXAMPLES 1 through 3

200 parts of poly methyl silsequioxane powder obtained in Preparation 1 were weighed in a cylindrical glass flask, mixed well by stirring, and heated to 80° C. 20 parts each of the surface-treating agent solution with the composition listed in Table 1 were added dropwise over a period of two hours while stirring. The temperature was raised to 150° C., and methanol and other unnecessary substances were removed by reducing the pressure to 100 mm/Hg. Stirring at that temperature was continued for two hours, giving surface-treated powder of poly methyl silsesquioxane.

The contact charge of each sample thus obtained, and of the untreated powder (Comparative Example 1), was measured by blow-off method using a contact charge tester. The result obtained is shown in Table 1.

TABLE 1

| | Comparative Example | Example | | |
|---|---|---|---|---|
| | 1 | 1 | 2 | 3 |
| Surface-treating agent solution (parts): | | | | |
| $H_2N(CH_2)_2NH(CH_2)_3Si(OCH_3)_3$ | Untreated | 1 | 2 | 10 |
| Methanol | | 19 | 18 | 10 |
| Contact charge ($\mu C/g$) | −950 | +150 | +270 | +330 |

PREPARATION 2

Spherical powder of poly methyl silsesquioxane having an average particle diameter of 1.2$\mu$m and having more than 99% of particles distributed in the 1.1 to 1.3$\mu$m diameter range was prepared in the same manner as in Preparation 1 except that 100 parts of 28% ammonia water was used in place of 50 parts.

EXAMPLES 4 through 6

Samples containing 200 parts of poly methyl silsesquioxane powder obtained in Preparation 2 were mixed well with 20 parts respectively of each surface-treating agent solution listed in Table 2, and each mixture was stirred for two hours at room temperature and pressure in an automatic mortar. Methanol and other unnecessary substances were removed by heating the mixture under reduced pressure in the same manner as in Example 1. Stirring was continued at 150° C. for four hours, giving surface-treated powder of poly methyl silsesquioxane.

The contact charge of each sample thus obtained, and of the untreated powder obtained in Preparation 2 (Comparative Example 2), was measured in the same manner as in Examples 1 through 3. The result is shown in Table 2.

TABLE 2

| | Comparative Example | Example | | |
|---|---|---|---|---|
| | 2 | 4 | 5 | 6 |
| Surface-treating agent solution (parts): | | | | |
| $H_2N(CH_2)_2NH(CH_2)_3Si(OCH_3)_3$ | Untreated | 1 | 2 | 10 |
| Methanol | | 19 | 18 | 10 |
| Contact charge ($\mu C/g$) | −1320 | +110 | +220 | +330 |

PREPARATION 3

Spherical powder of poly methyl silsesquioxane having an average particle diameter of 3.0$\mu$m and having 100% of particles distributed in 2.7 to 3.3$\mu$m diameter range was prepared in the same manner as in Preparation 1 except that 25 parts of 28% ammonia water was used in place of 50 parts.

EXAMPLES 7 through 9

Powder of surface-treated poly methyl silsesquioxane was obtained in the same manner as in Example 1, except that 200 parts of poly methyl silsesquioxane powder prepared in Preparation 3 was used as a powder and TBT-100 (tetrabutyl titanate; product name, produced by Nippon Soda Co., Ltd.) or isobutanol solution thereof as a surface-treating agent were employed as shown in Table 3.

The contact charge of each sample thus obtained, and of the untreated powder obtained in preparation 3 (Comparative Example 3), was measured in the same manner as in Examples 1 through 3.

TABLE 3

| | Comparative Example | Example | | |
|---|---|---|---|---|
| | 3 | 7 | 8 | 9 |
| Surface-treating agent solution (parts): | | | | |
| TBT-100 | Untreated | 2 | 10 | 20 |
| Isobutanol | | 18 | 10 | 0 |
| Contact charge ($\mu C/g$) | −660 | −510 | −450 | −220 |

EXAMPLES 10 through 12

Powder of surface-treated poly methyl silsesquioxane was obtained in the same manner as in Example 2, except that 200 parts of poly methyl silsesquioxane powder prepared in Preparation 1 was used as a powder and ASBD (aluminum secbutylate; product name, produced by Kawaken Fine Chemicals Co., Ltd.) or n-hexane solution thereof as a surface treating agent were employed as shown in Table 4.

The quantity of contact charge of each sample thus obtained, and of the untreated powder obtained in preparation 1 (Comparative Example 4), was measured in the same manner as in Example 1 through 3. The result is shown in Table 4.

TABLE 4

|  | Comparative Example 4 | Example 10 | Example 11 | Example 12 |
| --- | --- | --- | --- | --- |
| Surface-treating agent solution (parts): |  |  |  |  |
| ASBD | Untreated | 2 | 10 | 20 |
| n-hexane |  | 18 | 10 | 10 |
| Contact charge ($\mu$C/g) | −950 | −320 | +55 | +150 |

What is claimed is:

1. A surface-treated poly methyl silsesquioxane powder characterized by surface-treatment with an agent comprising a compound which has at least two radicals attached to a metal atom or a silicon atom, said radical is selected from the group consisting of a hydroxyl radical, a hydrolyzable radical and a movement hydrocarbon radical substituted by a polar group, wherein the average particle diameter of said powder is 5$\mu$m or smaller, said powder is spherical, and said powder has a particle size distribution that 80% or more of the particles have a diameter within the range of ±30% of the average particle diameter.

2. A powder as defined in claim 1, wherein the metal atom contained in the compound that constitutes said surface-treating agent is titanium.

3. A powder as defined in claim 1, wherein the compound that constitutes said surface-treating agent is a titanium alkoxide.

4. A powder as defined in claim 1, wherein the metal contained in the compound that constitutes said surface-treating agent is aluminum.

5. A powder as defined in claim 1, wherein the that constitutes said surface-treating agent is an aluminum alkoxide.

6. A powder as defined in claim 1, wherein the compound that constitutes said surface-treating agent is an alkoxysilane with an amino radical.

* * * * *